Patented Mar. 9, 1948

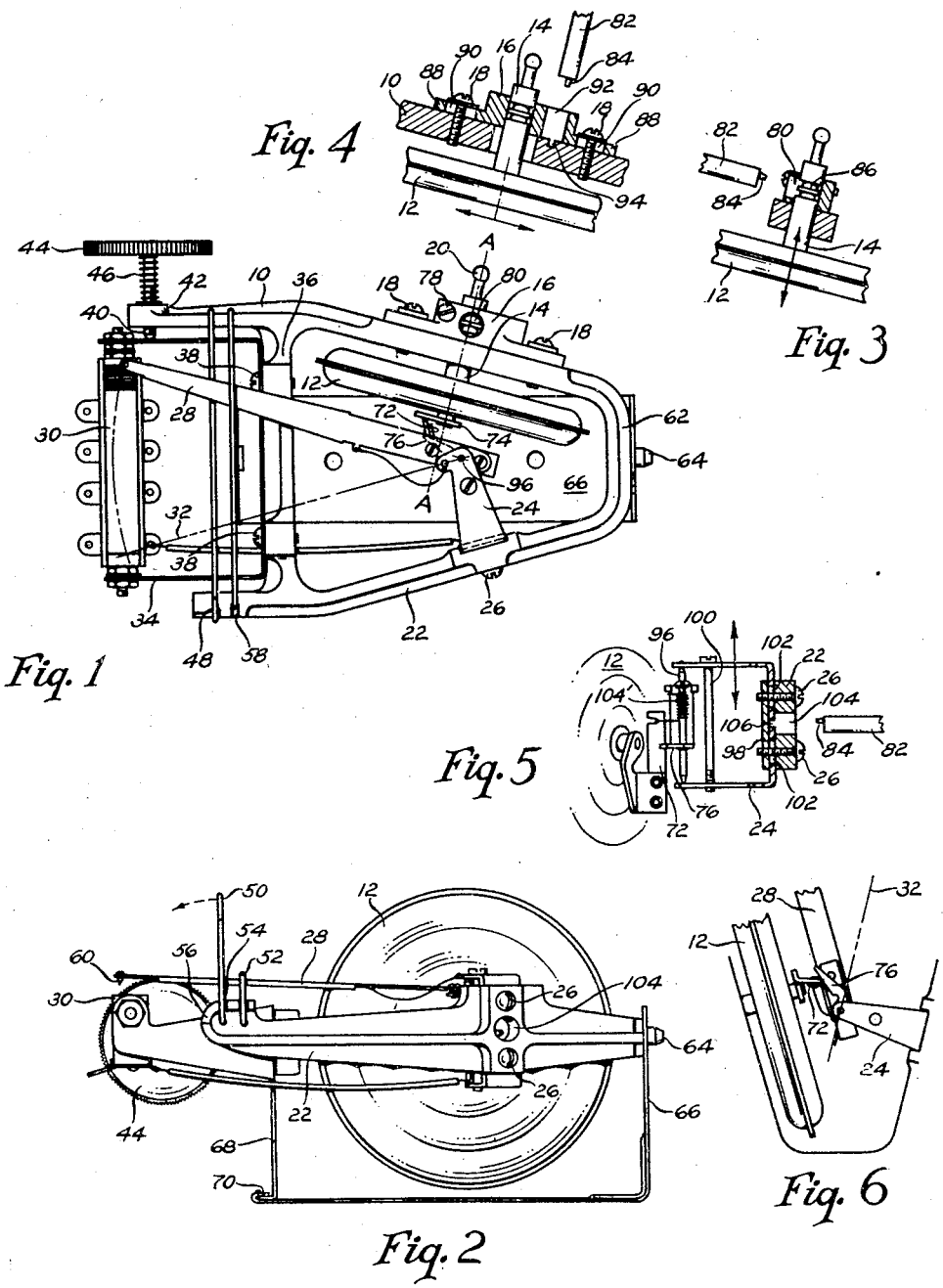

2,437,473

UNITED STATES PATENT OFFICE 2,437,473

PRESSURE SWITCH

William L. W. Ogden, Baltimore, Md., and William R. Ryan, Fairfield, Conn., assignors to Bendix Aviation Corporation, South Bend, Ind., a corporation of Delaware Application August 29, 1944, Serial No. 551,699

4 Claims. (Cl. 200—83)

This invention relates to pressure switches and more particularly to barometrically actuated switches sequentially engaging a series of contacts at predetermined pressure levels.

In apparatus for making meteorologic soundings of the atmosphere, use is frequently made of a system in which an aneroid driving unit is employed to successively connect test elements exposed to the conditions under measurement into the circuit of a low frequency oscillator serving to modulate a radio transmitter. The signals thus emanated are received upon the ground, their frequency measured, and the frequency measurements evaluated in terms of the conditions obtained in the upper atmosphere. In a conventional apparatus of this type, a temperature responsive or a humidity responsive element is connected to the low frequency oscillator circuit when a contact point rests upon a nonconducting or conducting segment respectively. Since the commutator switch effects the connection one or the other of the measuring elements at predetermined pressures corresponding to predetermined altitudes, it is necessary that the pressure required for each switching operation be accurately known, and to this end, it is, at present, customary to make a series of measurements of the pressures required to bring the contact point into engagement with each commutator segment and to plot a graph of this data for use by the observer in his evaluation procedure.

It is desirable that this graph be, if possible, substantially a straight line to ease the task of interpolation and further, that a single such chart serve the observer equally well for any temperature level within the operating range of the instrument, and that no temperature corrections for the pressure-switching characteristic be required. In the mass manufacture of instruments of this type, variations in the material of which the aneroid driving element is constructed are inevitably encountered. Differences in the thickness of the diaphragm material alter the deflection modulus, differences in the heat treatment of the diaphragms may alter the effect of temperature on the deflection modulus, and further, this unit may vary in its overall dimensions. Changes in the deflection modulus of the driving unit may be and have been compensated for by a change in the linkage ratio between the driving unit and the indicating element, but the effect of temperature changes in this class of apparatus has not been compensated for because of the difficulty in providing non-interlocking adjustments permitting independent adjustment for changes in the deflection modulus and the temperature coefficient of said deflection modulus.

One of the principal objects of this invention is to provide new and novel condition measuring apparatus with means for independently compensating for changes in the deflection modulus and variations in the temperature coefficient of the deflection modulus.

Another object of the invention is to provide new and novel indicating apparatus with non-interlocking adjustments for compensating variation in the deflection modulus, the temperature coefficient of the deflection modulus, and changes in the overall dimension of the driving unit.

A further object of the invention is to provide a new and novel barometrically responsive commutator switch assembly with non-interlocking adjustments compensating for variations in the characteristics of the material employed for the fabrication of the aneroid element.

Yet another object of the invention is to provide a new and novel barometrically actuated commutator switch assembly in which the position of the co-operating driving and indicating elements may be easily adjusted but is rigidly maintained upon the completion of such adjustment.

Still another object of the invention is to provide an accurately and readily controllable means for adjusting the relative position of two or more parts.

The above objects and advantages of the invention are substantially accomplished by providing three independent adjustments of the linkage between the aneroid driving unit and the contact pointer moving over the commutator assembly; one of such adjustments providing for movement of the aneroid in a degree of freedom parallel to the normal deflection travel; another providing for adjustment in a degree of freedom normal thereto and parallel to a preselected reference position of the contact arm; and a third adjustment providing for placing of the driving point between said aneroid element and said contact arm at a desired point on a bimetal link.

Other objects of the invention will in part be disclosed and in part be obvious when the following specification is read in conjunction with the drawings in which Figure 1 is a plan view of the completed barometric switch assembly.

Figure 2 is a view in elevation of said barometric switch assembly.

Figure 3 illustrates the details of the adjustment for changes in dimensions of the driving element.

Figure 4 illustrates the details of the adjustment for changes in the deflection modulus of the driving element.

Figure 5 illustrates the detail of the adjustment for changes in the temperature coefficient of the driving unit and Figure 6 illustrates the details of the driving connection between the driving unit and the contact pointer.

Turning now to Figures 1 and 2, there is seen a barometric switch having a cast frame 10, within which is mounted the aneroid element 12 carried by the hollow mounting stud 14 secured within the adjustable clamp 16 attached to the frame 10 by the screws 18. The mounting stud 14 is hollow so that it may serve as an exhaust tubulation for the aneroid assembly, the end of the tubulation being soldered shut upon the completion of the exhaust operation as shown at 20.

The side 22 of the casting 10 carries a pivot bracket 24 adjustably secured to the frame 10 by the screws 26. Pivoted within this bracket is the contact arm 28 whose end traverses the switch contact assembly 30 in response to movement of the free end of the aneroid element 12. The indicated position of the contact arm is substantially that corresponding to normal atmospheric pressures of 1,020 millibars while the center line 32 indicates the position of the contact arm corresponding to zero external pressure. The aneroid is substantially completely evacuated. The switch contact assembly 30 comprises an arrangement of alternate conducting and insulating segments assembled in a manner well known to the art and is mounted within the open ends of the U-shaped bracket 34 whose base is secured to the cross member 36 of the frame 10 by screws 38. The position of the switch contact assembly 30 with respect to the arc traversed by the end of contact arm 28 may be adjusted by the zero adjusting screw 40 situated within a tapped aperture in the end 42 of the frame 10 and bearing upon one of the limbs of the U-shaped member 34. The member 34 may be conveniently constructed with a bias in the direction of the zero adjusting screw to provide for a maximum adjustment range. The outer end of the screw 40 is provided with a knurled knob 44 for the convenience of the operator and a spring 46 is inserted between the knob 44 and a washer abutting the portion 42 of the casting 10 so that the adjustment of the zero adjusting screw will be secured by friction. Bridging the stub open ends 42 and 48 of the casting 10 are the contact arm lifter 50 and contact arm guard 52, whose free ends are bent inwardly and inserted in suitable apertures in the stub ends 42 and 48 respectively. Detent action for the contact arm lifter 50 is provided by the depressions 54 and 56 at the ends of its intended path of travel and the position of the contact arm guard 52 is secured by locating it within the slot 58. Rotation of the contact arm 50 counterclockwise lowers the contact arm 28 to permit the contact 60 to engage the surface of contact assembly 30.

The end 62 of the casting 10 is provided with a stud 64 for anchoring the mounting bracket 66 whose vertical extension is provided with a suitable co-operating aperture and whose other end is folded to receive the flange 70 of the depending portion 68 of the U-shaped member 34.

Mounted on the driving end of the aneroid element 12 is a stud carrying the bimetal 72 engaging the driving extension 76 which is a part of the assembly comprising contact arm 28. It is to be noted particularly that the plane of the bimetal element is not perpendicular to the direction of travel of the aneroid element but is substantially perpendicular to the line defined by the driving surface of the extension 76 when contact arm 28 is in position indicated by the center line 32; i. e., zero absolute pressure.

The diaphragm mounting stud 14 is annularly grooved, as shown most clearly in the sectional view of Figure 3 taken along the line A—A of Figure 1. The stud is located within the split collar clamp assembly 16 of conventional structure whose open ends may be brought together by the clamp screw 78 to secure the stud 14 in place. At a point on the mounting clamp opposite the annular grooves the clamp 16 is provided with a circular aperture 80. When it is desired to adjust the position of the aneroid element 12 in the direction of its travel to compensate for variations in the overall dimensions of the unit, clamp screw 78 is loosened and a tool 82 having an end similar to that shown in the figure is introduced in the aperture, the tip 84 of the tool projecting within the groove 86. As the tip 84 is eccentrically located of the center of the circular shank 82, rotation of the shank 82 permits control of the positioning of the aneroid diaphragm assembly in the direction of its travel, thereby compensating for variations in the length of the assembly. Upon the completion of the adjustment operation, screw 78 is re-tightened to secure the parts in the desired position.

The adjustment for variations in the deflection modulus of the aneroid driving unit is shown in Figure 4 which is a section through the clamp 16 taken in the plane of the drawing of Figure 1. Here it is evident that the clamp 16 is provided with ears 88 having slotted openings 90 whose minor dimension is equal to the diameter of the screws 18 but whose major dimension permits considerable clearance of the screws, so that when screws 18 are loosened, the entire assembly 16 with the associated diaphragm 12 may be moved in a degree of freedom parallel to the major dimension of the slots surrounding the screws 18. The retaining screws 18 are shown inserted in threaded apertures provided in the casting 10. The adjustable clamp 16 also has a circular through aperture as shown at 92, and in register with the aperture 92 a slot 94 is provided in the casting 10, this slot, whose major dimension extends perpendicular to the plane of the drawing, appearing in section at 94. To adjust the deflection rate of the contact arm 28, the screws 18 are loosened and the tool 82 is then inserted in the aperture 92 with the projection 84 engaging the slot 94, after which the tool is rotated to move the entire assembly to the required new position, and the screws 18 are then tightened to secure the assembly. It is at once evident that this moves the point of driving engagement between the bimetal 72 and the surface of the driving extension 76 to a point closer to or further from the shaft 96, thereby controlling the linkage ratio.

When the ambient temperature to which the switch is exposed is elevated from the reference value, the deflection of the aneroid driving unit 12 for a given pressure change increases, due to the decrease in the modulus of elasticity. To compensate for the greater deflection, it is necessary to decrease the driving ratio between the driving unit 12 and the contact arm 28. This is accomplished by the apparatus which is detailed in Figures 5 and 6. The bimetal 72 is arranged to bend in a direction away from the contact arm shaft 96 at temperatures higher than normal, and toward the shaft 96 at temperatures lower than normal. The total excursion of the bimetal 72 for a given change in temperature varies along its length, being zero at the point of support and a maximum at the tip of the free end. The tendency of the contact arm to travel farther for a given pressure change at higher temperatures than normal is thus overcome by the decrease in the ratio of the effective lever arms resulting from the deflection of the bimetal 72. Depending on the heat treat of the material of which the aneroid capsule 12 is constructed, different rates of correction for changes in temperature may be required, and in the apparatus shown this requirement is accommodated by arranging for the adjustment of the pointer assembly in a direction parallel to the axis of rotation, as shown by the double ended arrow, permitting the point of driving engagement between the bimetal 72 and the extension 76 to be adjusted to any point along the bimetal 72. To attain this, the contact arm support bracket 24 is provided with slots at 102 through which the mounting screws 26 located in the frame limb 22 pass into the tapped retaining plate 98. The slots 102 are so dimensioned that when the mounting screws 26 are loosened, the entire contact arm bracket assembly is movable only with a single degree of freedom parallel to the axis of shaft 96. The frame member 22 has a circular opening 104 between the mounting screws 26 and a slot 106 whose major dimension is transverse to the direction of motion in the bracket 24 is situated in register with this opening, as in the adjustable assemblies previously described. Upon loosening the screws 26 and inserting the tool 82, rotation of the tool shaft permits the accurate adjustment of the driving extension 76 to the desired point on the bimetal, after which the screws 26 may be tightened, locking the bracket 24 between the frame member 22 and the threaded retaining plate 98, after which the tool may be withdrawn. Displacement of the driving point away from the base of the bimetal 72 increases the amount of temperature correction introduced, and vice-versa. The bimetal 72 and the drive extension 76 for the arm 28 are maintained in engagement through the action of the spring 104' coiled on the shaft 96 and connected to each of these elements.

Now, it is clear that when the pressure outside the capsule is equal to the pressure inside the capsule 12, there will be no deflection of the capsule due to the stressing of its members, and therefore, no matter how the modulus of elasticity may vary with temperature, no deflection of the aneroid or motion of the contact arm 28 can result from a mere temperature change. It is evident that for this condition the temperature compensation must alter only the deflection rate, without changing the absolute deflection of the pointer 28. This is accomplished in the apparatus shown by relating the angle of the bimetal element 72 to the driving surface of the extension 76 in a manner insuring that, when the capsule 12 is at a position corresponding to equality of internal and external pressure, the bimetal element 72 will move in a direction parallel to the driving edge of extension 76, and there is thus no deflection of the pointer 28 from the proper position. Should the aneroid capsule 12 not be completely exhausted, the external pressure at which the capsule deflection is independent of temperature is not zero, nor is it equal to the internal pressure. In this case, the angle of the bimetal 72 with respect to the driving surface of the extension 76 is preferably selected to make the bimetal motion parallel to the driving edge at whatever value of pointer deflection corresponds to the zero temperature coefficient position.

In the assembly detailed in Figure 5, the pivot clearance at the ends of the shaft 96 is controlled by the adjustment of the adjustment screw 100, which squeezes the open ends of bracket 24 together or permits them to open as it is tightened or loosened respectively. So that the clearance does not vary greatly for large changes in ambient temperature, the adjustment screw 100 and shaft 96 are made of the same material, or of materials having the same coefficient of expansion.

The mode of operation of the assembly is evident from the previous description. The switch is connected into the usual radio sounding transmitter in the conventional manner, and upon ascent of the balloon borne sounding apparatus through the atmosphere, the aneroid capsule is acted upon by a pressure which diminishes gradually. The resulting deflection of the aneroid drives the contact 60 mounted on the contact arm 28 across the surface of the contact assembly 30, successively connecting the desired test elements into the transmitting circuits of the radio transmitter. During a flight, the instrument may be exposed to temperatures varying from 130° F. on the ground to —50° F. in the upper atmosphere, resulting in considerable difference in the deflection rate of the aneroid driving unit. As the diaphragm assembly becomes stiffer and stiffer with decreasing temperature, the bimetal element deflects more and more toward the axis of rotation of the contact arm 28, increasing the mechanical drive ratio of this element in an amount which is selected by adjustment at the factory to exactly compensate for the change in deflection rate. Therefore, contact with a given segment of the assembly 30 always corresponds to the same pressure, and the height of the testing apparatus may be determined directly from the switching sequence without the necessity of the introduction of a temperature correction. Before the beginning of a flight, the position of the contact assembly 30 may be adjusted by the rotation of the knob 44 to insure that at the start of the flight the contact 60 rests upon the desired contact.

Not only does this pressure switch ease the task of the observer who must evaluate the condition of the atmosphere from the indications delivered by the sounding apparatus. In the initial fabrication of the switch assembly with the inevitably encountered commercial variations in materials, the convenience and independence of the adjustments speeds the production of units having uniform operating characteristics. The absolute deflection adjustment of Figure 3 does not change the deflection rate of the pointer 28, since the drive ratio between the aneroid driving unit and the pointer is not affected thereby, nor does it change the temperature correction adjustment, since the point on the bimetal 72 engaging the drive extension 76 is unchanged. The adjustment of initial pointer position may therefore be made without reference to the other diaphragm characteristics. The rate adjustment of Figure 4 does not affect the position of pointer 28 at zero pressure, thus not disturbing the setting of the absolute deflection adjustment, and again does not change the point of the bimetal 72 engaging the drive extension 76, thus leaving the temperature correction unaltered. The pointer 28 may therefore be set to the required position of the contact switch block 30 when the instrument is at the calibration temperature without any fear that it will affect other adjustments made before or subsequently.

The temperature correction of Figures 5 and 6 may also be effected without reacting on the other adjustment, since movement of the pointer assembly in the direction of the arrows shown changes neither the lever arm nor the absolute deflection value. An examination of the apparatus as set forth in the drawings reveals that this independence of adjustments is due to the fact that the three movements employed for the adjustment are mutually perpendicular, the rate and temperature correction adjustments being perpendicular to the direction of the diaphragm assembly deflection.

In the apparatus shown, the pointer is constructed of an elastic material to permit its ready deformation by the pointer lifter 50 for the purpose of separating contact 60 from the contact block 30. Where necessary or desired, the pointer may be hinged at a suitable point along its length to enable the lifting of the pointer from the contact block without fear of permanent distortion. It will be obvious that many other changes and modifications may be made in the invention without departing from the spirit thereof as expressed in the foregoing description and in the appended claims.

We claim:

1. In a measuring instrument, a driving unit responsive to a condition under measurement and having a deflection modulus varying with a second condition, an indicating element, means including compensation means responsive to variations in said second condition linking said driving unit and said indicating element, means for adjusting the position of said driving unit in a direction parallel to the deflections thereof, means for adjusting the position of said driving unit relative to said indicating element in a direction perpendicular to said deflection direction, and means for adjusting the position of said driving unit relative to said indicating element in a direction mutually perpendicular to each of said first two mentioned directions.

2. In a measuring instrument, a driving unit responsive to a condition under measurement and having a deflection modulus varying with a second condition, a driven element, a substantially linear compensating element responsive to variations in said second condition extending in a direction perpendicular to the deflection travel of said driving unit and transmitting the driving force to said driven element at a point shiftable in response to said flexing action, means for adjusting the relative position of said driving unit and said driven element in a direction perpendicular to said deflection travel, and means for adjusting the point of contact between said driven element and said compensating element along the length of said compensating element.

3. In pressure responsive apparatus, a driving unit responsive to changes in pressure and having a deflection modulus varying with temperature, there being a zero coefficient value of deflection at which driving unit deflections are independent of variations in temperature, a temperature responsive bimetal strip carried by said driving unit and having its longitudinal dimension substantially perpendicular to the deflection travel of said driving unit, a driven element rotatably mounted on an axis parallel to the mean position of the longitudinal dimension of said bimetal strip and having a drive surface maintained in engagement with the edge of said bimetal strip, means for adjusting the position of said driving unit along the line of deflection travel, means for adjusting the position of said driving unit along a line perpendicular to said line of deflection travel, and means for adjusting the position of said driven element along a line parallel to said axis of rotation.

4. In pressure actuated switching apparatus, a driving unit responsive to changes in pressure and having a deflection modulus varying with temperature, there being a zero coefficient value of deflection at which driving unit deflections are independent of variations in temperature, a temperature responsive bimetal strip carried by said driving unit and having its longitudinal dimension substantially perpendicular to the deflection travel of said driving unit, a driven element rotatably mounted on an axis parallel to the mean position of the longitudinal dimension of said bimetal strip and having a drive surface maintained in engagement with the edge of said bimetal strip, means for adjusting the position of said driving unit along the line of deflection travel, means for adjusting the position of said driving unit along a line perpendicular to said line of deflection travel and to said axis of rotation, means for adjusting the position of said driven element along a line parallel to said axis of rotation, a contact block supported at a distance from said axis of rotation, a contact bearing arm actuated by said driven element and having a contact engageable with said contact block, and means for forcing and maintaining said contact out of engagement with said contact block.

WILLIAM L. W. OGDEN.
WILLIAM R. RYAN.

REFERENCES CITED

The following references are of record in the file of this patent:

UNITED STATES PATENTS

| Number | Name | Date |
|---|---|---|
| 1,930,899 | Kollsman | Oct. 17, 1933 |
| 2,100,754 | Seegers | Nov. 30, 1937 |
| 2,178,799 | Loen | Nov. 7, 1939 |
| 2,194,624 | Titterington | Mar. 26, 1939 |
| 2,209,540 | Ruopp | July 30, 1940 |
| 2,315,137 | Shaw | Mar. 30, 1943 |
| 2,322,229 | Diamond et al. | June 22, 1943 |
| 2,340,718 | Wallace | Feb. 1, 1944 |